3,306,765
METHOD FOR FIREPROOFING WOOD AND THE TREATED WOOD

Eugene R. Du Fresne and Donald L. Campbell, Chicago, Ill., assignors to General Dynamics Corporation, New York, N.Y., a corporation of Delaware
No Drawing. Filed Sept. 3, 1963, Ser. No. 306,294
11 Claims. (Cl. 117—62)

The invention relates to a fire-resistant cellulosic material and to a method for producing such a material. More particularly, the invention relates to fire-resistant wooden materials suitable for outdoor use and methods for making such materials.

Various attempts have been heretofore made to produce fire-resistant materials by impregnating these materials with chemicals to render them non-flammable. Many of the methods developed have proved too costly to be economically feasible. Other of the methods have proved generally unsatisfactory in that the fire-resistant characteristics of the materials degrade with time and weathering.

The principal object of the present invention is to provide an improved fire-resistant cellulosic material and a method for making such a material. Another object of the invention is to provide a process which will render wood fire-resistant while not destroying its natural appearance and strength. A further object of this invention is to produce a fire-resistant cellulosic material which will withstand weathering without deterioration to its fire-resistant characteristics and a method for producing such a material. These and other objects of the invention are more particularly set forth in the following detailed description of processes embodying various features of the invention.

It has been found that wood can be made fire-resistant by impregnating it with a solution containing a soluble silicate and then treating the impregnated wood with sufficient carbon dioxide to form a silicon dioxide polymer. Whenever used in this application, the term "wood" should be taken to mean any natural cellulosic material or wood product. Treatment of the impregnated wood produces a reaction between the carbon dioxide and the silicate which results in the formation of an insoluble fire-resistant substance which cannot be washed from the wood. It is believed that the carbon dioxide treatment forms a polymer of silicon dioxide of sufficient size and length that it cannot be easily washed from the interstices of the wood.

The soluble silicate used may be one or more alkali metal silicates selected from group consisting of sodium, potassium, lithium, cesium, and rubidium silicates, or other silicates, such as ammonium silicate, may also be used. Because of their availability and cost, sodium and potassium silicate, or mixtures thereof, are usually used. Generally, the silicate will be added to the wood in the form of an aqueous solution, although other suitable solutions may also be used.

A solution of a crystalline silicate is preferred to a colloidal silicate, such as a water glass solution, which has a higher viscosity that makes impregnation difficult and impractical for certain types of wood. If an alkali metal silicate is used, the ratio of the silicon dioxide to alkali metal oxide in the silicate solution may vary somewhat, but it is preferably less than about 1.6 to 1. Also, aqueous solutions of crystalline alkali metal silicates are preferred. Examples of suitable solutions include those prepared from compounds such as sodium metasilicate ($Na_2SiO_3$) and sodium orthosilicate ($Na_4SiO_4$). A sodium metasilicate solution is most preferable because it is less subject to loss as a result of weathering after treatment.

Although impregnation with an alkali silicate solution, and subsequent treatment with carbon dioxide, imparts fire-resistant properties to wood, preferably the impregnating solution contains a soluble borate along with the silicate. The combined silicate-borate solution produces a wood product having even more satisfactory fire-resistance. It is believed that the borate combines with the silicate so that when the silicate is polymerized, the borate is at least partly bound up in the silicate polymer. The addition of the borate increases the resistance of the final product to glowing combustion, that is, when a product treated with the combined solution is removed from a source of flame, no glowing embers remain. Preferably, the borate is present as sodium tetraborate ($Na_2B_4O_7$), however, other soluble alkali metal tetraborates can be used, and other soluble borates, such as the metaborates, may also be used.

The impregnating solution preferably contains a major portion of soluble silicate and a minor proportion of soluble borate. Although the ratio of borate to silicate is not critical, a ratio of about ¼ mole to about ½ mole of borate to one mole of silicate provides satisfactory results.

Impregnation of the wood with the impregnating solution may be accomplished by various methods. Of course, the thickness of the wood being impregnated will affect the amount of time necessary for desired impregnation. For example, a piece of wood ½ inch thick may be impregnated by immersing the same in the solution at an elevated temperature (e.g. at about 100° C.) for about 7 hours.

In another method, a ½ inch thick piece of wood is placed in a vacuum chamber which is evacuated to a pressure of less than about 1 inch of mercury. The chamber is then filled with the impregnating solution so as to envelop the wood, and, after filling, returned to atmospheric pressure. After about 10 minutes, sufficient impregnation has taken place.

As another method, a ½ inch thick piece of wood is positioned in a pressure vessel which contains a sufficient amount of the impregnating solution to cover the wood. The pressure in the vessel is then elevated, for example, to a pressure of about 400 p.s.i. After about five minutes under these conditions, the wood is sufficiently impregnated. Obviously, combinations of these methods may also be used.

Impregnation so that the wood contains from about 1 pound to about 15 pounds of residual silicate-borate per cubic foot is considered satisfactory. Impregnation in the range of about 1 pound to about 4 pounds of silicate-borate per cubic foot of wood is preferable. Although the fire-resistant properties of the wood naturally continue to increase with the further addition of impregnant, it is felt that impregnation to about 4 pounds per cubic foot provides maximum protection in relation to impregnating cost. Impregnation to higher amounts does not further increase the fire-resistance of the wood a sufficient amount to be considered economically feasible for most applications.

After impregnation, the wood is treated with sufficient gaseous carbon dioxide to react with the solution dispersed in the wood. Treatment of the wood with carbon dioxide may also be carried out by various suitable methods, but mere exposure to ordinary air is insufficient because the percentage of $CO_2$ is too small. Exposure of the impregnated wood in a substantially carbon dioxide atmosphere at atmospheric pressure for a period of about 8 hours is sufficient to cause the desired polymerization of silicate. Alternately, a few minutes exposure of the impregnated wood to carbon dioxide at a pressure of about 300 to about 800 p.s.i. produces sufficient polymerization.

One of the important features of the invention is that the fire-resistance of the wood is retained although the wood is subjected to weathering, especially repeated exposure to rain and the like. To test their retentive properties various samples of wood are subjected to continuous washing for extended periods after treatment with a borate-silicate solution. The test results are calculated to determine the percentage of the borate and silicate lost from the samples as a result of this washing relative to the total amount that is added during impregnation.

In the test procedure, samples of wood which are impregnated under the same conditions are split into two groups. Only the second group is treated with $CO_2$. Both groups are subjected to similar washing. About 27% by weight of the silicate and about 31% of the borate is lost from the first group as a result of the washings. The second group of samples, which is treated with carbon dioxide, loses only about 15% of the silicate and about 26% of the borate, an improvement of 12% and 5% respectively. Thus, it can be seen that the treatment with carbon dioxide substantially improves the retention properties of the fire-resistant impregnant within the wood, making these products especially suitable for outdoor use where they are repeatedly subjected to rain and other forms of moisture.

It is believed that the numerical test results arrived at and herein set forth may be on the conservative side for the comparison of the amount of silicate lost. In the test procedure used, the total loss was first determined for each sample, and then the amount of borate was determined, leaving the silicate figure to be determined by a measure of the difference. Although this figure is accurate for the untreated samples, in which the loss is entirely sodium silicate, in the treated samples, some of the sodium is lost as sodium carbonate, leaving a greater amount of silicate remaining in the sample than is actually reflected by the figures. Therefore, it is expected that, if a more specific test were run for the silicate itself, it would be shown that even less than 15% of the silicate is lost from the treated samples, therefore resulting in an improvement of greater than 12% in the total retention of silicate as a result of the carbon dioxide treatment.

After the carbon dioxide-treated samples are washed, they are suitably dried and then subjected to tests for fire-resistance. Exposure of a treated sample to a very hot Bunsen flame, about 1500° F., for a period of about 30 seconds proves that it will not ignite. The sample will, of course, char but will not burn. After the sample is removed from the flame, it does not support a flame, and any glowing combustion is minor and of extremely short duration. There are no universally recognized tests for fire-resistance of wood products for building construction and the like. These samples are judged satisfactorily fire-resistant for building purposes. Other tests of the samples for strength prove that the impregnation and treatment with carbon dioxide does not decrease the structural strength of the wood in any manner which might impair its use as building material.

The following examples illustrate some satisfactory methods for producing a fire-resistant wood product in accordance with the invention. However, the invention is not to be considered as being limited to the illustrative examples hereinafter set forth but is to extend fully to the overall description set forth in the specification including the claims.

*Example I*

A suitable aqueous solution of sodium silicate is prepared in a one molar concentration using sodium metasilicate. Pieces of red cedar having dimensions of 2" x 12" x ½" are immersed in the solution so that they are below the surface and completely covered by the solution. The temperature of the solution is raised to about 100° C. and held at this point. After about 5 hours under these conditions, the samples are removed from the solution. Two of the samples are set aside and two other samples are exposed to a carbon dioxide atmosphere for about 8 hours. One sample which was treated with $CO_2$ and one untreated sample are tested to determine the amount of silicate that is in the samples as a result of the impregnation step. The results are the same, about 5 pounds per cubic foot.

Both remaining samples are then washed in running water at a temperature at about 45° F. for 24 hours. At the end of this period, the two samples are removed and suitably dried. The dried samples are tested to determine the effect of the washing upon the samples of silicate which has been respectively lost from each sample. Testing shows that the carbon dioxide-treated sample lose only about 16% of its silicate, whereas the untreated sample loses about 27% of its silicate.

The dried, treated sample is then exposed to a Bunsen flame, at a temperature of about 1500° C., for about 30 seconds. The sample chars but does not ignite. When removed from the flame, the sample does not support a flame, and a slight amount of glowing combustion immediately present dies out in a matter of seconds. A similar red cedar sample that has not been impregnated with silicate bursts into flame after a few seconds over the Bunsen burner. The treated sample is adjudged to have satisfactory fire-resistance.

The structural properties of the sample are checked against those of a similar piece of red cedar from which the sample was cut. No noticeable change in structural properties of the wood is detected.

*Example II*

An impregnating solution is prepared from equal parts of a one molar solution of sodium metasilicate and a 0.5 molar solution of sodium tetraborate. Similar pieces of red cedar as used in Example I are impregnated by first subjecting them to vacuum conditions, a pressure of about 1 inch of mercury for about 2 minutes. The vacuum chamber is then filled with sufficient solution to completely cover the wood samples and the vacuum is broken. After about 10 minutes impregnation at atmospheric pressure, the samples are removed from the solution and drained. Two of the samples are set aside and two other samples exposed to carbon dioxide for about 5 minutes under a pressure of about 500 p.s.i.

The samples are tested, washed, and dried as set forth in Example I. Final testing of the washed samples shows that an untreated sample loses about 27% by weight of the silicate with which it has been impregnated and about 31% of the borate. The samples which were treated with carbon dioxide only lose about 16% of the silicate and about 26% of the borate.

A dried, treated sample is then exposed to a Bunsen flame, at a temperature of about 1500° C., for about 30 seconds. The sample chars but does not ignite. When it is removed from the flame, no further combustion is apparent. The sample does not support a flame nor is there any glowing combustion. The treated sample is adjudged to have satisfactory fire-resistance.

The structural properties of the sample are checked and show no decrease in structural strength. The treated sample material is considered to be well suited for use in building construction.

*Example III*

An aqueous solution of sodium silicate and sodium borate is prepared from equal parts from a one molar solution of sodium orthosilicate and 0.25 molar solution of sodium tetraborate. Test samples, similar to those in Example I, are immersed in a pressure vessel containing a sufficient amount of this solution to completely cover the samples. The pressure is then raised to about 400 p.s.i. for about 5 minutes. At the end of this time, the samples are removed and split into two groups. The one group is exposed to carbon dioxide at about 300 p.s.i. for 5 minutes. At the end of this time, samples from each group are checked to determine the amount of silicate and borate presently dispersed within the samples.

The samples are then subjected to the washing procedure set forth in Example I and, at the end of this operation, are suitably dried. Testing of the dried samples is carried out and compared with the original values of silicate and borate found to have been dispersed in the impregnated samples. The samples which were not treated with carbon dioxide lose about 47% of the silicate and about 56% of the borate. The samples which were treated lose about 36% of the silicate and about 35% of the borate. Testing also shows that the treated samples have about 3 pounds of residual silicate-borate per cubic foot of wood.

A treated sample is then exposed to a Bunsen flame, at a temperature of about 1500° C., for about 30 seconds. The sample chars but does not burn. When removed from the flame, the sample does not support combustion. There is no flame or glowing combustion after removal. The treated sample is adjudged to have satisfactory fire-resistance.

The structural properties of the sample are checked and no noticeable change in structural properties is detected. The sample is considered well suited for use in building construction.

The invention provides a fire-resistant cellulosic material which retains its fire-resistance under extensive washing, thus showing that weathering will not significantly deteriorate the fire-resistance of cellulosic material. Although the samples char under direct, intense flame, they do not support combustion. Furthermore, use of the minor portion of borate, in addition to the silicate, provides a fire-resistant material which is not even subject to glowing combustion. The novel fire-resistance which is provided by the invention and which can be economically imparted to wood is a significant advance over previous attempts to fire-proof wood.

Various of the features of the invention are set forth in the following claims.

What is claimed is:

1. A fire-resistant wood comprising wood having dispersed therein the reaction product of carbon dioxide and a solution containing a soluble crystalline silicate and a soluble borate.

2. A fire-resistant wood comprising wood having dispersed therein the reaction product of carbon dioxide and a solution containing a soluble crystalline silicate and a soluble alkali metal borate, said solution containing about one-quarter to one-half mole of borate per mole of silicate.

3. A fire-resistant wood comprising wood having dispersed therein the reaction product of carbon dioxide and a solution containing a soluble crystalline alkali metal silicate and a soluble alkali metal borate in an amount of between about one pound and about fifteen pounds of silicate-borate per cubic foot of wood.

4. A fire-resistant wood comprising wood having dispersed therein the reaction product of carbon dioxide and a solution containing a soluble borate and a soluble crystalline silicate selected from the group consisting of the metasilicates, the orthosilicates and combinations thereof.

5. A fire-resistant wood comprising wood having dispersed therein the reaction product of carbon dioxide and a solution containing sodium tetraborate and an alkali metal silicate selected from the group consisting of sodium metasilicate, potassium metasilicate, sodium orthosilicate, potassium orthosilicate, and combinations thereof, in an amount of between about one pound and about fifteen pounds of silicate-borate per cubic foot of wood.

6. A fire-resistant wood comprising wood having dispersed therein the reaction product of carbon dioxide and a solution containing a major portion of an alkali metal silicate selected from the group consisting of sodium metasilicate, sodium orthosilicate, and combinations thereof, and a minor portion of sodium tetraborate in an amount of between about one pound and about four pounds of silicate-borate per cubic foot of wood.

7. A method of fireproofing a wood comprising impregnating the wood with a solution containing a soluble crystalline silicate and a soluble borate and treating the impregnated material with sufficient carbon dioxide to form a silicon dioxide polymer therein that is insoluble and noncombustible.

8. A method of fireproofing wood comprising impregnating the material with a solution containing a soluble crystalline alkali metal silicate and a soluble alkali metal borate to provide between about one pound and about fifteen pounds of silicate-borate therein per cubic foot of wood and treating the impregnated wood with sufficient carbon dioxide to form a silicon dioxide polymer therein that is insoluble and noncombustible.

9. A method of fireproofing wood comprising impregnating the wood with a solution containing sodium metasilicate and sodium tetraborate and treating the impregnated material with sufficient carbon dioxide to form a silicon dioxide polymer therein that is insoluble and noncombustible.

10. A method of fireproofing wood comprising impregnating the wood with a solution containing a soluble crystalline silicate and a soluble borate in a ratio of about one-quarter to one-half mole borate per mole of silicate and treating the impregnated wood with sufficient carbon dioxide under super-atmospheric pressure to form a silicon dioxide polymer therein that is insoluble and noncombustible.

11. A method of fireproofing wood comprising impregnating the wood with a solution containing an alkali metal silicate selected from the group consisting of sodium metasilicate and sodium orthosilicate and combinations thereof, and sodium tetraborate to provide between about one pound and about four pounds of silicate-borate therein and treating the impregnated wood with sufficient carbon dioxide to form a silicon dioxide polymer therein that is insoluble and noncombustible.

References Cited by the Examiner

UNITED STATES PATENTS

| | | | |
|---|---|---|---|
| 225,858 | 3/1880 | O'Connor | 117—138 |
| 963,810 | 7/1910 | Sala | 117—138 |
| 1,035,789 | 8/1912 | Henning. | |
| 1,136,370 | 4/1915 | Scharwath | 117—138 XR |
| 1,224,204 | 5/1917 | Perkin et al. | 117—138 |
| 1,224,205 | 5/1917 | Perkin et al. | 117—138 |
| 1,271,506 | 7/1918 | Ferguson. | |
| 1,396,264 | 11/1921 | Filippo | 117—138 XR |
| 1,766,606 | 6/1930 | Coolidge | 117—147 XR |
| 2,086,938 | 6/1937 | Hess. | |
| 2,373,512 | 4/1945 | Starner. | |
| 2,420,644 | 5/1947 | Athy et al. | 117—138 |

WILLIAM D. MARTIN, *Primary Examiner.*

T. G. DAVIS, *Assistant Examiner.*